United States Patent [19]

Washburn et al.

[11] Patent Number: 4,483,932

[45] Date of Patent: Nov. 20, 1984

[54] REFRACTORY BODIES FOR CORROSIVE ENVIRONMENTS

[75] Inventors: Malcolm E. Washburn, Princeton; Charles W. Taylor, Clinton, both of Mass.

[73] Assignee: Norton Company, Worcester, Mass.

[21] Appl. No.: 549,114

[22] Filed: Nov. 7, 1983

[51] Int. Cl.³ .................. C04B 35/04; C04B 35/12
[52] U.S. Cl. ................................................. 501/117
[58] Field of Search .............................. 501/115, 117

[56] References Cited

U.S. PATENT DOCUMENTS 4,331,771  5/1982  Washburn ........................... 501/97
4,435,514  3/1984  Hartline ............................. 501/117

Primary Examiner—James Poer
Attorney, Agent, or Firm—Frank S. Chow

[57] ABSTRACT

The gasification of coal can be accomplished more efficiently if it is operated at a temperature high enough so that the mineral constituents of the coal will form a molten slag which can be continuously removed from the gasifier during operation. Proper control of such a process requires careful temperature control, but the molten coal slag has been found to be corrosive to most thermocouple materials and to conventional refractory ceramics which are used as thermocouple protection tubes in other environments. It has now been found that magnesium chromite serves satisfactorily as a corrosion resistant refractory material in molten coal slags, and that thermocouple protection tubes of this material can be made by isostatic pressing of granular magnesium chromite and subsequent firing.

20 Claims, No Drawings

REFRACTORY BODIES FOR CORROSIVE ENVIRONMENTS

BACKGROUND OF THE INVENTION

1. Field of the Invention

This invention relates to the field of refractory bodies capable of surviving and protecting their contents if any under exposure to very high temperatures. More particularly it relates to such refractory bodies in the form of tubes, with one closed and one open end, used to protect thermocouples when they are used to determine the temperature of high temperature materials which would rapidly corrode the thermocouples if they were in direct contact. Still more particularly, this invention relates to such thermocouple protection tubes which are used in slagging coal gasifiers.

A slagging coal gasifier is so named because it is operated at a sufficiently high temperature to cause the mineral residues from the coal to take the form of slags. By control of temperature, the properties of the slag can be adjusted so that the slag will run down the wall of the gasifier and out the bottom, thereby permitting the gasifier to operate in a continuous manner.

2. Description of the Prior Art

Conventional thermocouple protection tubes are usually made of common and relatively low cost ceramics such as fireclay, alumina, or zirconia for low, moderately high, and very high temperature ranges respectively. These materials have proved satisfactory for most high temperature environments but are rapidly corroded by the environment of slagging coal gasifiers, with consequent damage to the thermocouples.

More specifically relevant prior art is shown in U.S. patent application Ser. No. 06/395,550 by Stephen D. Hartline filed July 6, 1982, now U.S. Pat. No. 4,435,514, the entire specification of which is hereby incorporated herein by reference. This Hartline application describes a magnesium chromite refractory material which was found to be highly resistant to chemical attack by coal slags in molten condition. We applied the teachings of this Hartline application to the manufacture of thermocouple tubes but found that the results were not always satisfactory, because of varying degrees of slag penetration into the tubes.

SUMMARY OF THE INVENTION

We have now found that satisfactory refractory bodies for the protection of thermocouples or other materials in the environment of working slagging coal gasifiers can be prepared from magnesium chromite in the general manner described by Hartline. In order to assure satisfactory performance in thermocouple protection tubes, the following specifications are necessary in addition to those given by Hartline: (1) the molar ratio of chromia to magnesia must be one or slightly greater; (2) the total content of magnesia and chromia in the body must aggregate to at least 96% by weight of the total body; (3) the average pore diameter must be 9 microns or less, and no more than 10% by volume of the total of the pores may have a diameter of more than 20 microns; and (4) the walls of the body must have a permeability to water at normal ambient temperature of not more than 2 $cm^3/cm^2/hr$.

DESCRIPTION OF THE PREFERRED EMBODIMENTS

The manufacture of the refractory bodies of this invention is most conveniently begun via the preparation of granular magnesium chromite ($MgCr_2O_4$) by cofusing magnesium oxide (MgO) and chromic oxide ($Cr_2O_3$). At least as many moles of chromia as of magnesia should be present in the fused mixture, and for safety a slight excess of chromia over this amount is preferred. The magnesia and chromia starting materials should be at least 96% pure, and 98% or more purity is preferred. The totally fused mixture is allowed to cool to a homogenous solid which is then crushed and sized by screening in a conventional manner to yield a grog material for shaping refractory bodies. Generally, crushed magnesium chromite grog with a mesh size of between 36 and 50 is preferred for the bulk of the body to be formed, with some smaller sized grog also being used.

The preferred binder for the formation of green bodies for this invention consists of a combination of conventional binding agents such as glue and methyl cellulose with magnesium and chromic oxides ground to a fineness of at least 200 mesh. The molar ratio between chromia and magnesia in the binder powder should be one or slightly greater as for the grog.

To make greenware bodies, the magnesium chromite grog and the finely ground magnesium and chromic oxides are blended together while dry in some conventional manner such as with a Hobart mixer. Water dispersions of the glue, methyl cellulose, or other similar binding aids are then added to the already well blended dry ingredients in sufficient quantity to give a slightly dry mixture suitable for pressing. Greenware of any conventional shape may be formed by any conventional pressing means at about 5000 pounds/$in^2$ (psi) or 34.5 megapascals/square meter ($MPa/m^2$).

In order to describe additional embodiments it is convenient to define some special terms. A surface of a material body is considered approximately cylindrical, approximately conical, or substantially hemispherical if each point on the surface is within 1 mm of a true, mathematically cylindrical, conical, or hemispherical surface respectively. If a material surface approximates within this standard the surface of a frustrum of a cone, and if the taper factor, i.e., the difference between the diameters of the larger and the smaller ends of the frustrum of the cone divided by the length between the larger and smaller ends, is less than 0.1, then the material surface is described herein as a tapered cylinder. If an elongated continuous hollow material body has walls for at least 90% of its total length which are defined by an inner and an outer surface, and if each of these inner and outer surfaces is either approximately cylindrical or is a tapered cylinder as defined above, and if any remaining portion of the material body is contained within an imaginary infinite projection of the cylinder or tapered cylinder most closely conforming to its outer wall, then the body is described herein as substantially cylindrical.

A particularly preferred embodiment of this invention is a substantially cylindrical long narrow tube with one rounded closed end and the other end open. Such tubes are used for protecting thermocouple wires in hazardous environments such as coal gasifiers. Such tubes may be very conveniently and effectively made in greenware form in a dry bag isostatic pressing apparatus such as is conventional in the art. Additional directions specific for elongated thermocouple tubes are given as part of Example III in U.S. Pat. No. 4,331,771, which is hereby incorporated herein by reference.

The greenware tubes after pressing may be fired in any conventional manner to a sufficiently high temperature for a sufficient time so as to produce a fired tube with a density and permeability within the limits already specified. For example, the tubes could be laid horizontally on sagger plates and fired at a temperature increase rate of 70° C./hr to a hot soak temperature of 1450° C., maintained at that temperature for four hours, and cooled sufficiently slowly to prevent breakage.

After firing and cooling, the tubes should be tested for water permeability and pore distribution. The test for water permeability is performed as described immediately below.

Tubes are filled to the top with water at room temperature. Water immediately begins to flow out of the tubes. The time from filling is measured until the water has dropped some convenient distance from the top; such distance should be only a small fraction of the total length of the tube, so that the change in inside diameter of the tube over the distance can be ignored without impairing the accuracy of the calculation below. The distance of the water from the top is measured by a depth probe. The drop in water level in cm is designated as D, the inside radius of the tube at its open end in cm is designated R, the average inside radius of the tube over its entire inside length in cm is designated r, the inside length in cm is designated L, and the time in hours required for the water drop to occur is designated t. The permeation rate P in cubic centimeters of water per square centimeter of tube surface per hour is then given by the equation:

$$P = (DR^2)/[2r(L - \tfrac{1}{2}D)t].$$

If P is not more than 2, the permeation rate is sufficiently low.

In order to measure the pore size distribution, sections approximately 2.5 cm in length and 0.6 cm in both width and thickness were cut from the thermocouple tubes or from test specimens fired with them. The cut sections were then placed in a Quantichrome Scanning Macro Porosimeter, using mercury as the infiltration medium. This instrument yields a value for mean pore diameter and for an upper bound on the diameter of the pores which aggregate to at least 90% of the total pore volume in the sample. If the mean is no more than 9 microns and the upper bound no more than 20 microns, the pore size distribution is satisfactory.

The scope and utility of this invention are further illustrated by the following examples.

EXAMPLE 1

The mixture for charging to the mold had the following composition, in parts by weight:

| | |
|---|---|
| Fused MgCr$_2$O$_4$ grog, 36–50 mesh | 40 |
| Fused MgCr$_2$O$_4$ grog, finer than 50 mesh | 25 |
| Finely divided Cr$_2$O$_3$ | 29.1 |
| Finely divided MgO | 5.9 |
| 10 wt % suspension of glue in water | 3.5 |
| 2.5 wt % suspension of methyl cellulose in H$_2$O | 3.5 |

The MgCr$_2$O$_4$ grog had a slight excess of chromia over the exact stoichiometric composition; it was prepared as described by Hartline. This mixture was blended in a Hobart mixer and charged to the hollow space of a mold such as described in U.S. Pat. No. 4,331,771. For this example, the inside diameter of the inner rubber cylinder was 1 and 31/64 inches or 3.77 cm and the outside length of the space in the mold was about 19 inches or 48 cm. The greenware tube was pressed at 5000 psi or 34.5 MPa and then fired at 1450° C. for four hours. The fired tube had the following measurements and properties:

| | |
|---|---|
| Outside length | 18.1 in or 46.0 cm |
| Outside diameter | 1.15 in or 2.92 cm |
| Inside diameter at open end | 0.62 in or 1.57 cm |
| Wall thickness at open end | 0.26 in or 0.66 cm |
| Wall thickness at closed end | 0.32 in or 0.81 cm |
| Density | 3.47 gm/cm$^3$ |
| Water permeation rate | 1.98 cm$^3$/cm$^2$/hr |
| Mean pore diameter | 5.0 microns |
| Upper bound diameter of 90% of pores | 10.8 microns |

The fired tube was tested for corrosion in a bath of molten Western acid coal slag maintained at a temperature of 1570° C. Nitrogen was introduced at a rate of about 30 cubic feet or 850 liters per hour into the chamber over the crucible containing the molten slag. It was estimated that the partial pressure of oxygen above the slag was 10$^{-5}$ atmospheres and that the viscosity of the slag was about 90 poises.

This slag, which is considered one of the most corrosive ones of commercial importance, was analyzed as having the following composition in parts by weight: SiO$_2$, 52.4; Al$_2$O$_3$, 22.5; Fe$_2$O$_3$, 6.0; TiO$_2$, 1.1; CaO, 10.1; MgO, 1.8; Na$_2$O, 1.9; K$_2$O, 0.5; Mn$_3$O$_4$, 0.03; P$_2$O$_5$, 0.2; SrO, 0.3; BaO, 0.3; C, 2.0. Thus, the ratio of basic to acidic oxides is 0.28, indicative of high acidity.

The tube was lowered into the molten slag at a rate of about 1.5 cm/min (relatively slowly to diminish thermal shock) until an immersion depth of 7.5 cm had been reached. A thermocouple (platinum/platinum-rhodium) inserted into the protective tube while it was immersed gave a temperature reading 60°–75° C. less than the independently measured temperature of the furnace. The temperature measured in the protection tube is considered to be more representative of the actual temperature of the slag. Furnace temperature would normally be higher than that of the slag because of thermal conductivity of the crucible and slag along with cooling effects from the nitrogen gas flow above the molten slag.

The protective tube was withdrawn from the molten slag bath after 24 hours continuous immersion. No cracks were observed in the protective tube and it had a good sonic ring when struck. The modulus of elasticity was measured by sonic techniques and found to be 65 gigapascals, comparable to that of an unused companion tube made in the same way. This indicates absence of significant cracking in the tube structure.

The immersed end of the tube was cut in half lengthwise for microscopic examination. There was evidence of slag penetration into the outer pores of the protective tube over the entire length which had been immersed but no evidence that any slag had entered into the protected inner space.

EXAMPLE 2

By varying the dimensions of the molding apparatus, a tube with the characteristics shown in the table below was prepared from the same materials and by the same processes as for Example 1:

| | |
|---|---|
| Length, cm: | 44.5 |
| Outside diameter, cm: | 2.94 |
| Inside diameter, cm: | 1.57 |
| Wall thickness at top, cm: | 0.69 |
| Wall thickness at bottom, cm: | 0.84 |
| Water permeation, cm$^3$/cm$^2$/hr: | 1.19 |
| Fired density, gm/cm$^3$: | 3.51 |
| Mean pore diameter, microns | 6.5 |
| Upper bound on 90% of pores, microns | 13.2 |

The tube of Example 2 performed as satisfactorily in service in molten coal slag as that described in Example 1. However, when otherwise similar tubes were fired at lower temperatures so that their fired density was only 3.30–3.35 gm/cm$^3$ and/or made with thinner walls, so that their water permeation rate was above 2.4 cm$^3$/cm$^2$/hr, and/or made with to narrow a range of grog particle sizes or too little pressing, so that their porosity was above the limits given above, slag penetrated the inner portion of the tubes upon exposure to molten slag for 24 hours or more, and some of these tubes ruptured during use.

We claim:

1. A hollow refractory body for service in molten coal slag, said body comprising magnesium chromite and chromia to the extent of at least 96% by weight and having a bulk density of at least 3.5 gm/cm$^3$, a sufficient wall thickness so that the permeation of water through said wall is not greater than 2.0 cm$^3$ of water per cm$^2$ of area of wall surface per hour, a mean pore diameter not greater than 9 microns, and an upper bound of not more than 20 microns on the diameter of an individual pore among the group of smallest diameter pores which together aggregate to at least 90% of the total pore volume.

2. An article according to claim 1 in the form of a substantially cylindrical tube open at one end and closed at its other end.

3. A tube according to claim 2 wherein the closure at one end of said tube comprises a substantially hemispherical shell having an inner radius of curvature half the inside diameter of the cylindrical portion of said tube at its circle of contact with said substantially hemispherical shell and an outer radius of curvature half the outside diameter of the said cylindrical portion of said tube at its circle of contact with said hemispherical shell.

4. A tube according to claim 3 wherein the inner surface is a tapered cylinder with a taper factor of at least 0.05 and its larger diameter at the open end.

5. A tube according to claim 2 wherein the inner surface is a tapered cylinder with a taper factor of at least 0.05 and its larger diameter at the open end.

6. An article according to claim 5 made by a process comprising the steps of:

(a) isostatically pressing a mixture comprising at least one half by weight magnesium chromite particles of mesh size 36 and smaller to form a coherent greenware body, and (b) firing said greenware body at a temperature of at least 1450° C. for a period of at least four hours.

7. An article according to claim 4 made by a process comprising the steps of:

(a) isostatically pressing a mixture comprising at least one half by weight magnesium chromite particles of mesh size 36 and smaller to form a coherent greenware body, and (b) firing said greenware body at a temperature of at least 1450° C. for a period of at least four hours.

8. An article according to claim 3 made by a process comprising the steps of:

(a) isostatically pressing a mixture comprising at least one half by weight magnesium chromite particles of mesh size 36 and smaller to form a coherent greenware body, and (b) firing said greenware body at a temperature of at least 1450° C. for a period of at least four hours.

9. An article according to claim 2 made by a process comprising the steps of:

(a) isostatically pressing a mixture comprising at least one half by weight magnesium chromite particles of mesh size 36 and smaller to form a coherent greenware body, and (b) firing said greenware body at a temperature of at least 1450° C. for a period of at least four hours.

10. An article according to claim 1 made by a process comprising the steps of:

(a) isostatically pressing a mixture comprising at least one half by weight magnesium chromite particles of mesh size 36 and smaller to form a coherent greenware body, and (b) firing said greenware body at a temperature of at least 1450° C. for a period of at least four hours.

11. An assembly comprising an article according to claim 10 containing a thermocouple.

12. An assembly comprising an article according to claim 9 containing a thermocouple.

13. An assembly comprising an article according to claim 8 containing a thermocouple.

14. An assembly comprising an article according to claim 7 containing a thermocouple.

15. An assembly comprising an article according to claim 6 containing a thermocouple.

16. An assembly comprising an article according to claim 5 containing a thermocouple.

17. An assembly comprising an article according to claim 4 containing a thermocouple.

18. An assembly comprising an article according to claim 3 containing a thermocouple.

19. An assembly comprising an article according to claim 2 containing a thermocouple.

20. An assembly comprising an article according to claim 1 containing a thermocouple.

* * * * *